United States Patent [19]
Kashiwamura et al.

[11] Patent Number: 5,839,782
[45] Date of Patent: Nov. 24, 1998

[54] TORSION-BAR EQUIPPED VIBRATION ABSORBING-SEAT DEVICE

[75] Inventors: Takayoshi Kashiwamura; Akira Homma; Nozomu Munemura, all of Yokohama; Toshimichi Hanai, Yokosuka; Kazuhito Kato, Yokohama; Kozo Yamaura, Fujisawa, all of Japan

[73] Assignee: NHK Spring Co., Ltd., Kanagawa-ken, Japan

[21] Appl. No.: 614,247

[22] Filed: Mar. 12, 1996

[30] Foreign Application Priority Data

Mar. 15, 1995 [JP] Japan .................................. 7-055897

[51] Int. Cl.$^6$ ........................................................ B60N 2/00
[52] U.S. Cl. .................. 297/337; 297/452.55; 297/216.1
[58] Field of Search ..................... 297/452.55, 216.17, 297/216.19, 216.2, 216.16, 216.1, DIG. 1, 337, 311, 338, 313; 248/608, 581, 618, 632

[56] References Cited

U.S. PATENT DOCUMENTS

| | | | |
|---|---|---|---|
| 3,008,764 | 11/1961 | Pile | 297/DIG. 1 X |
| 3,329,230 | 7/1967 | De Castelet | 248/608 X |
| 3,645,488 | 2/1972 | Sturhzan | 248/564 |
| 4,027,843 | 6/1977 | Thompson | 248/632 |
| 4,195,883 | 4/1980 | Roonhult et al. | 248/564 X |

FOREIGN PATENT DOCUMENTS

| | | | |
|---|---|---|---|
| 303795 | 2/1989 | European Pat. Off. | 297/216.19 |
| 5-15232 | 4/1993 | Japan | |
| 8-84633 | 4/1996 | Japan | |

*Primary Examiner*—Milton Nelson, Jr.
*Attorney, Agent, or Firm*—Lowe, Price, LeBlanc & Becker

[57] ABSTRACT

A seat device has a cushion frame mounted on a floor; a support member for supporting a seat pad; and a torsion bar including a torque bar section and an arm section, for elastically supporting the support member on cushion frame. An arm supporting bracket of substantially cylindrical shape is provided on the support member. A collar rotatably fitted to at least arm supporting bracket has a circumferential flange in a cylindrical shape with a bottom, and is disposed to be facing to an end surface of the arm supporting bracket on the opening side thereof. A tip portion of the arm section is fittedly supported in the opening of the collar. The arm supporting bracket is attached to the support member through a movement absorbing mechanism which allows relative movement with respect to the support member.

6 Claims, 10 Drawing Sheets

FIG.4
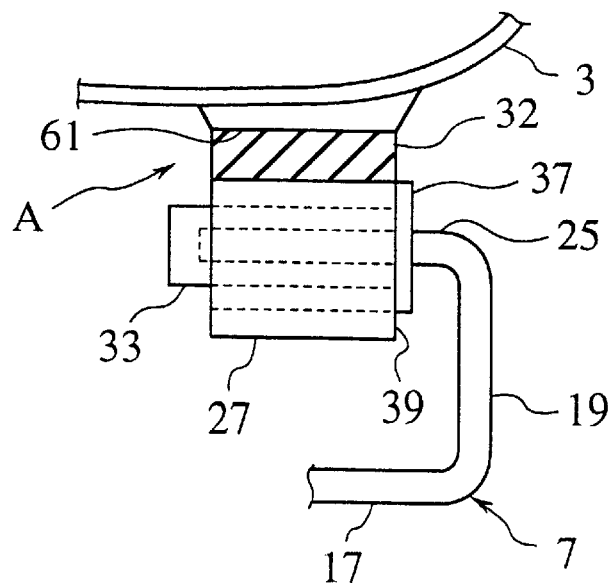
FIG.5A
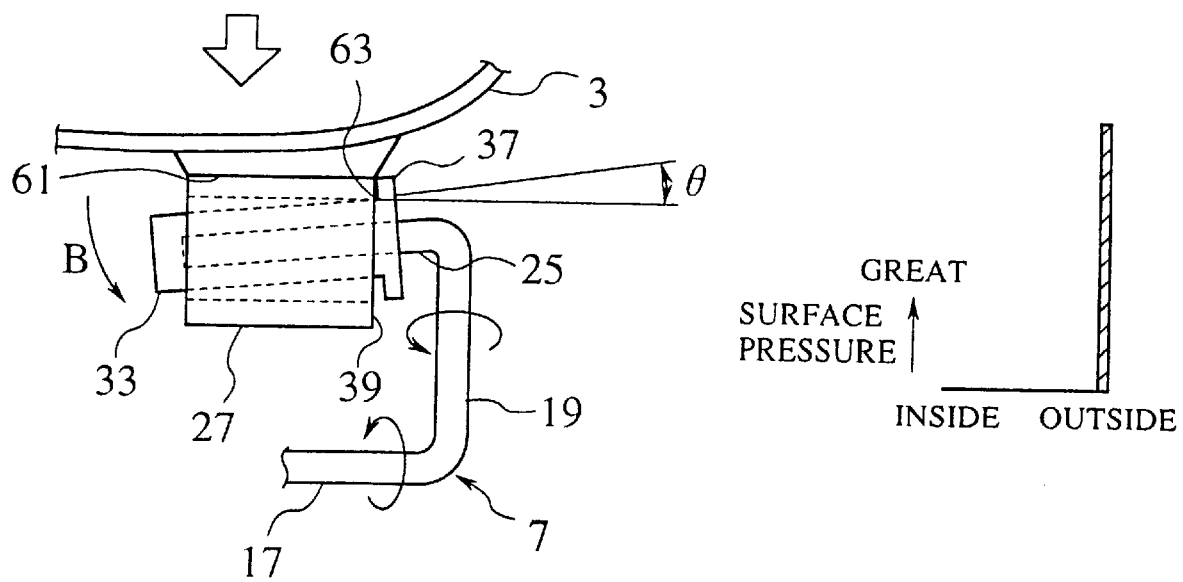
FIG.5B

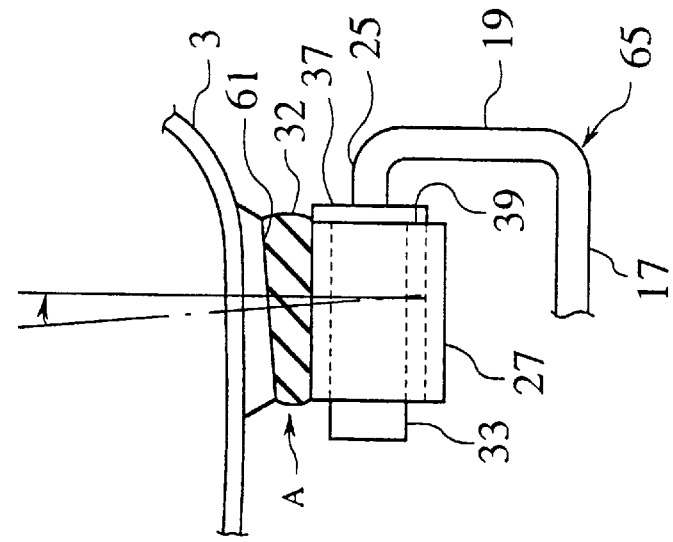
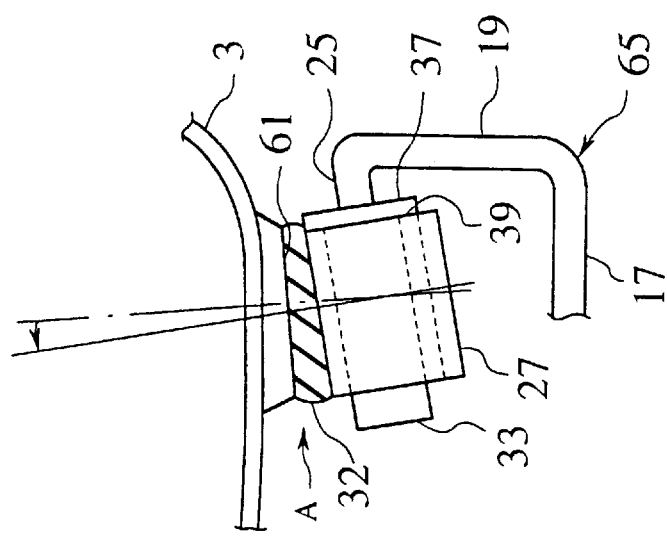
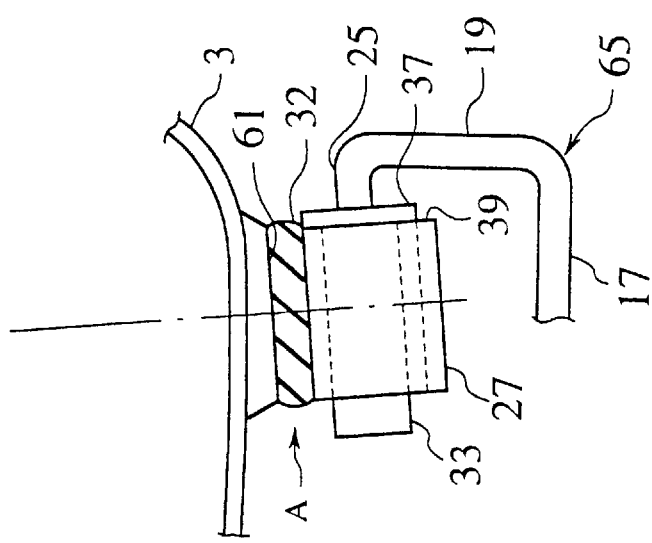

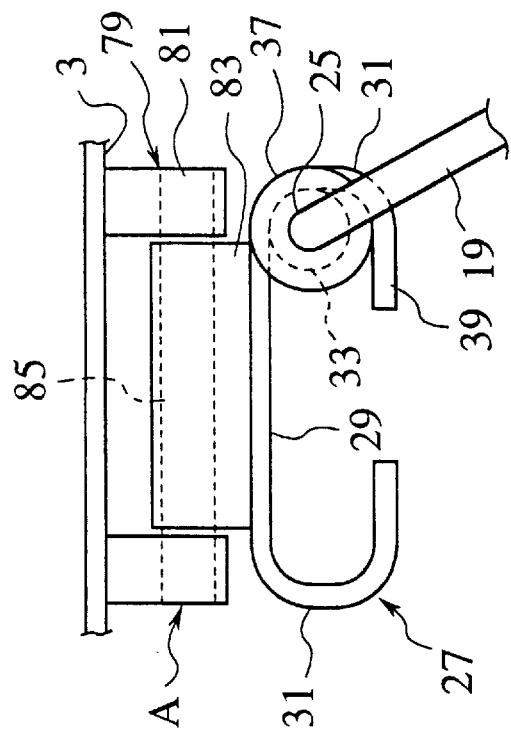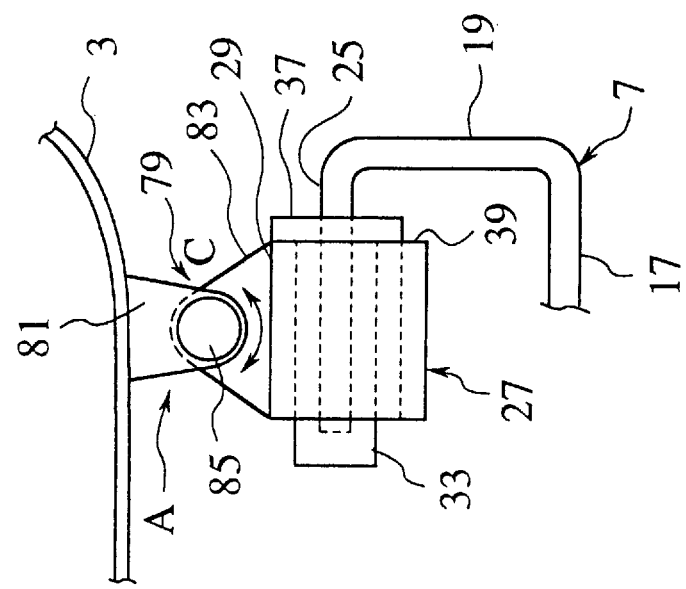

TORSION-BAR EQUIPPED VIBRATION ABSORBING-SEAT DEVICE

BACKGROUND OF THE INVENTION

1. Field of the Invention

The present invention relates to a seat device for elastically supporting, by a torsion bar, a support member such as a support panel or the like which supports a seat pad.

2. Description of Related Art

As this kind of conventional seat device, there have been known one shown in FIGS. 1 and 2 (see Japanese Examined Utility Model publication No. Hei 5-15232). This seat device has been used as a seat for an automobile for example, which includes a cushion frame 101, a support member 103, and a torsion bar 105. The cushion frame 101 is mounted on a floor side. The support member 103 consists of support pipes 107 on both sides of a seat in the width direction thereof, and S springs 109 tensioned between the support pipes 107. The torsion bar 105 consists of a torque bar section 111 and an arm section 113. The torque bar section 111 is rotatably supported on the cushion frame 101 by a bracket 115, and one end of the torque bar section 111 is fitted to a through hole 119 provided in the cushion frame 101. The arm section 113 is integrally provided on the other end of the torque bar section 111, and the tip section 121 of the arm section 113 is bent in a direction toward the support pipe 107 and is fitted to the support pipe 107 with play.

Thus, when an occupant is seated on a seat, the arm section 113 is rotated downward as shown in FIG. 2, whereby the torque bar section 111 is twisted and the support member 103 and a seat pad (not shown) come to a standstill at a position where the reaction force is balanced with downward load due to seating. Further, when vibration is given, the vibration can be absorbed by the torsion bar 105.

However, since the arm section 113 of the torsion bar 105 and the support pipe 107 of the support member 103 are in a fitting state with play, the support pipe 107 and the tip 121 of the arm section 113 can be relatively moved in the axial direction or the seat longitudinal direction. Accordingly, the axial direction end surface of the support pipe 107 comes into contact with the arm section 113, thereby being likely to give a discontinuous feeling in bending to the occupant and bad effects on vibration properties, on seating.

The invention disclosed herein provides a seat which ensures the user a comfortable ride through improved vibration reduction.

SUMMARY OF THE INVENTION

Therefore, it is an object of the present invention to provide a seat device which can ensure more comfortable ride and vibration breaking properties.

To solve the above-described object, according to a first aspect of the present invention, there is provided a seat device comprising: a cushion frame mounted on a floor, a support member for supporting a seat pad, and a torsion bar including a torque bar section and an arm section, for elastically supporting said support member on said cushion frame, an arm supporting bracket in a substantially cylindrical shape being provided on said support member, a collar being provided, which is rotatably fitted to at least said arm supporting bracket and has a circumferential flange in a cylindrical shape with a bottom, facing to an end surface of said arm supporting bracket on the opening side thereof, a tip portion of said arm section being fittedly supported in the opening of said collar, and said arm supporting bracket being attached to said support member through a movement absorbing mechanism which allows relative movement with respect to the support member.

According to a second aspect of the present invention, there is provided a seat device wherein said movement absorbing mechanism is an elastic body.

According to a third aspect of the present invention, there is provided a seat device wherein said arm supporting bracket is attached to the tip portion of the arm section and the collar with a relative angle previously so that the arm supporting bracket corresponds to an inclination position in a seat vertical direction, when the tip portion of said arm section and collar are moved by static seating.

According to a fourth aspect of the present invention, there is provided a seat device wherein said movement absorbing mechanism is a hinge mechanism.

According to a fifth aspect of the present invention, there is provided a seat device comprising: a cushion frame mounted on a floor, a support member for supporting a seat pad, and a torsion bar including a torque bar section and an arm section, for elastically supporting said support member on said cushion frame, an arm supporting bracket in a substantially cylindrical shape being provided on said support member, a collar being provided, which is fitted to at least said arm supporting bracket relatively movably in a seat longitudinal direction or a seat width direction and rotatably, and has a circumferential flange in a cylindrical shape with a bottom, facing to an end surface of said arm supporting bracket on the opening side thereof, a tip portion of said arm section being fittedly supported in the opening of said collar, and said arm supporting bracket being previously inclinedly attached to the circumferential flange at a position where the collar is attached to, so that the end surface of the arm supporting bracket corresponds to movement of the circumferential flange in the collar in the seat longitudinal direction and width direction.

According to a sixth aspect of the present invention, there is provided a seat device, wherein said elastic body is a mount rubber.

According to a seventh aspect of the present invention, there is provided a seat device, wherein said elastic body is an elastic plate.

According to a eighth aspect of the present invention, there is provided a seat device, wherein said movement absorbing mechanism is a spherical surface joint.

According to the above-mentioned first aspect of the invention, the relative movement in the axial direction, between the arm section of the torsion bar and the arm supporting bracket on the support member side can be controlled by the fact that the circumferential flange of the collar faces to the end surface of the arm supporting bracket. Thus, friction between the arm section and the arm supporting bracket can be prevented. Further, even if the arm section fitted to the collar is moved in a manner that the axis thereof is inclined by the action of load on the collar, relative movement of the arm supporting bracket with respect to the support member can be allowed through a movement absorbing mechanism and the arm supporting bracket can follow the collar. Therefore, generation of relative angle between the collar and the arm supporting bracket can be prevented.

According to the second aspect of the invention, in addition to the effects of the first aspect, the movement of the arm supporting bracket can be absorbed by an elastic body.

According to the third aspect of the invention, in addition to the effects of the first and second aspects of the invention, even if the tip portion of the arm section and the collar are moved by static seating so as to incline the axis, the arm supporting bracket is attached, with a relative angle, to the tip portion of the arm section and the collar. Accordingly, the arm supporting bracket corresponds to a position inclined in the seat vertical direction of the tip portion of the arm section and the collar, whereby the relative angles between the arm supporting bracket and the tip portion of the arm section and between the arm supporting bracket and the collar can be changed to zero or a small level. Thus, in a case where vibration or the like is given, the respective relative angles between the arm supporting bracket, and the tip portion of the arm section and the collar are changed relatively from zero or a small level, whereby wear between the collar and the arm supporting bracket can be prevented.

According to the fourth aspect of the invention, in addition to the effects of the first aspect of the invention, the movement of the arm supporting bracket can be allowed by a hinge mechanism.

According to the fifth aspect of the invention, even if the circumferential flange is moved in the seat longitudinal and width directions on seating, the arm supporting bracket is previously inclinedly attached to the circumferential flange at a position where the collar is attached to, so that the end surface of the arm supporting bracket corresponds to movements of the circumferential flange in the collar in the seat longitudinal and width directions. Thus, friction between the circumferential flange and the end surface of the arm supporting bracket can be suppressed.

BRIEF DESCRIPTION OF THE DRAWINGS

FIG. 4 is an enlarged front view of a main portion of the seat device;

FIG. 5A–5B are comparative examples of a main portion of the seat device wherein a displacement absorbing mechanism is omitted, particularly 7A is a front view thereof and 7B is a graph showing the surface pressure;

FIG. 9A–9F are explanatory view of effects, particularly 11A is a front view of the main portion showing a state after statically seated, 11B is a graph showing the surface pressure at the time, 11C is a front view of the main portion showing a state when displace downward, 11D is a graph showing the surface pressure at the time, 11E is a front view of the main portion showing a state when displace upward, 11F is a graph showing the surface pressure at the time;

FIG. 11A–11B are enlarged view of a main portion of a seat device according to a third example of the present invention, particularly 13A is a front view thereof and 13B is a side view thereof.

DETAILED DESCRIPTION OF THE PREFERRED EMBODIMENTS

Examples of seat devices according to the present invention will now be described.

FIRST EXAMPLE

Figure 1:
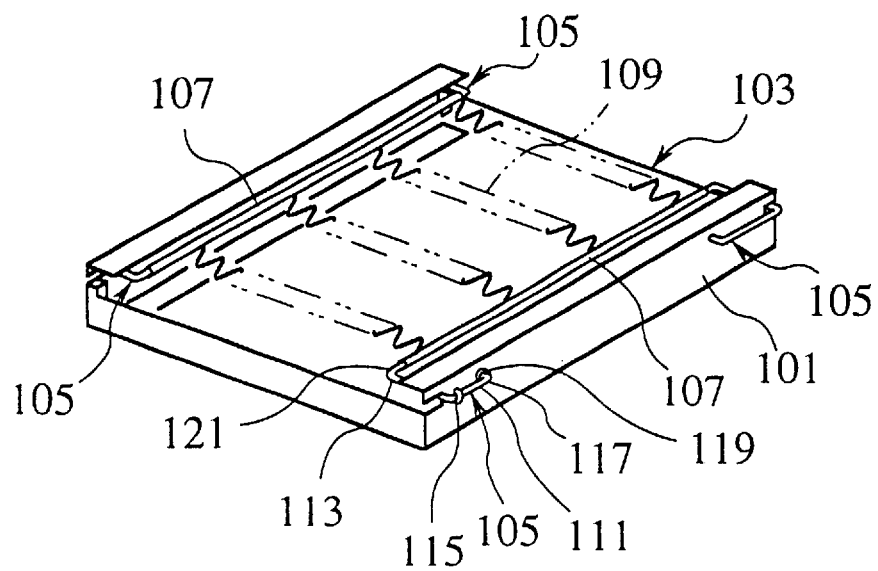
FIG. 1 is a whole perspective view showing a main portion of a seat device according to a conventional example.
Figure 2:
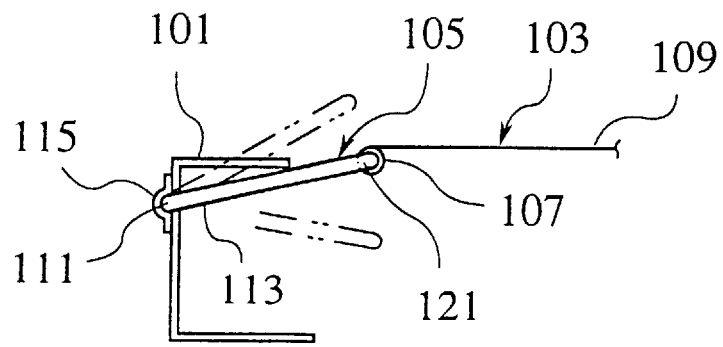
FIG. 2 is an enlarged view of a main portion according to the conventional example.
Figure 3:
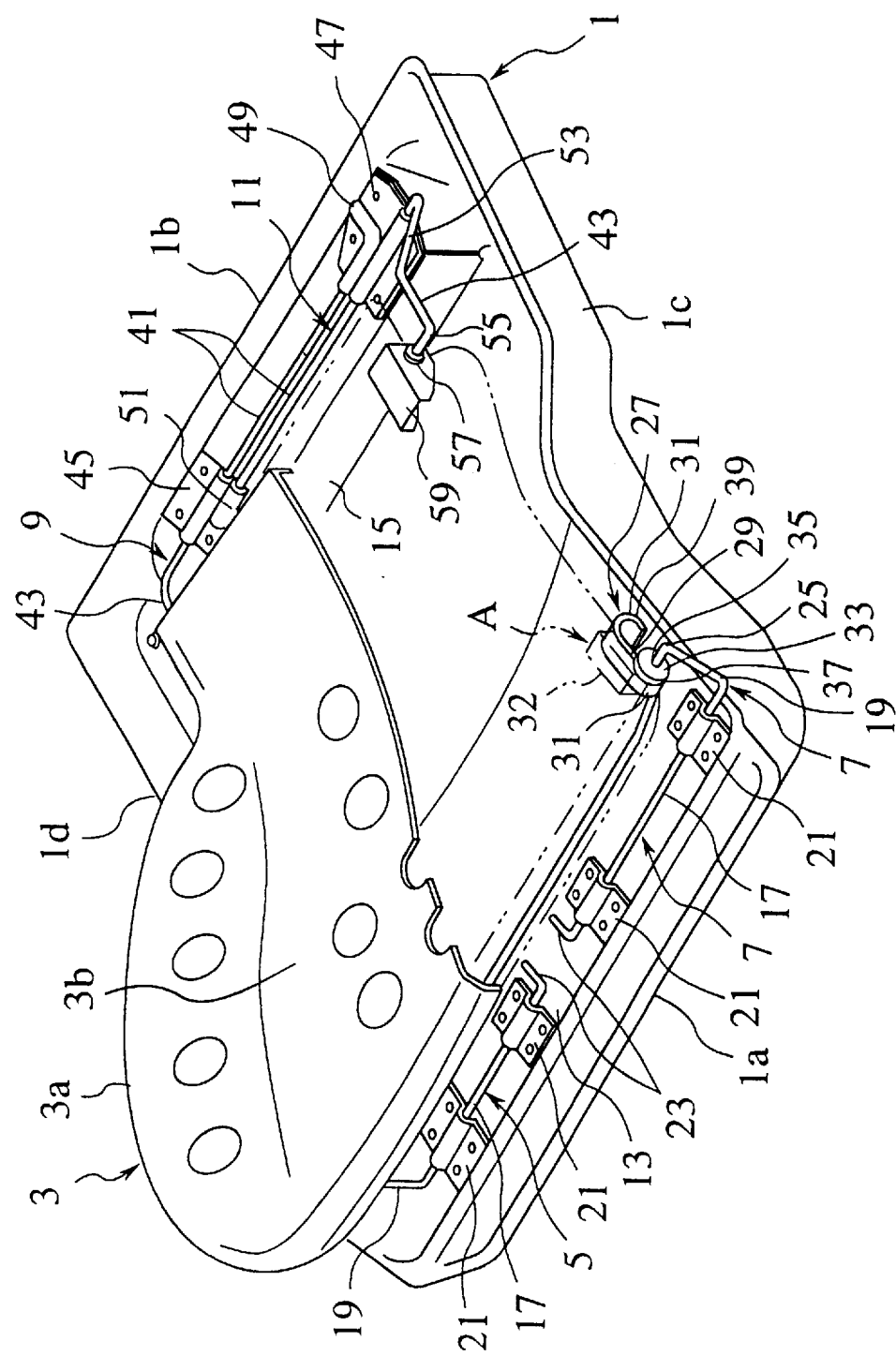
FIG. 3 is a whole perspective view of a seat device according to a first example of the present invention.
Figure 6A:
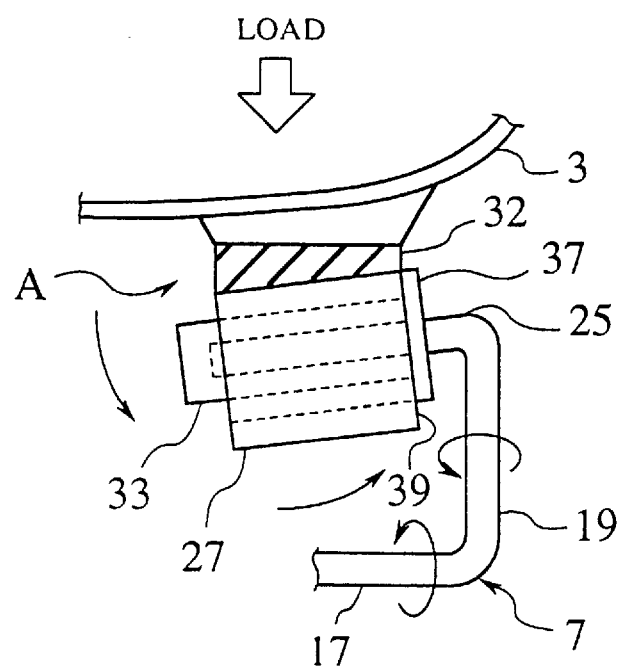
FIGS. 6A–6B are explanatory views of effects, particularly 8A is a front view of the main portion of the seat device and 8B is a graph showing the surface pressure thereof.
Figure 6B:
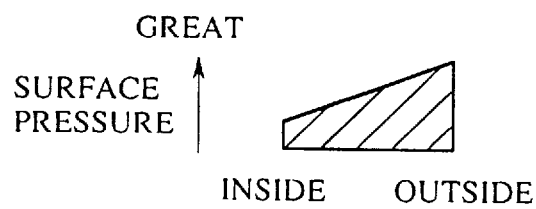

FIG. 3 shows a perspective view of a seat device according to a first example of the present invention. The seat device is applied to, for example, a seat for an automobile. The seat device includes a cushion frame 1, a support panel 3 used as a support member, and torsion bars of a right front section torsion bar 5, a left front section torsion bar 7, a right rear section torsion bar 9 and a left rear section torsion bar 11.

The cushion frame 1 is formed in a concave-shaped section, which has front, rear, left and right walls 1a, 1b, 1c, and 1d. A front bracket 13 for supporting front fittings is provided in the front section of the cushion frame 1, and a rear bracket 15 for supporting rear fitting is provided in the rear section thereof.

The support panel 3 has a bank section 3a on both sides thereof in a seat width direction and a concave central section 3b in a concave cross-section.

The right front section torsion bar 5 and the left front torsion bar 7 have symmetrical shapes, respectively, and have the same supporting structure. Thus, the left front section torsion bar 7 shown in FIG. 3, will be described, and explanations of the right front section torsion bar 5 will be omitted. The same parts of the right front section torsion bar 5 as in the left front section torsion bar 7 are designated by the same reference numbers as that of the latter.

The left front section torsion bar 7 includes a torque bar section 17 and an arm section 19. The torque bar sections 17 are disposed on the front bracket 13 for supporting fittings and rotatably supported by fittings 21 for supporting the front torsion bar. Engagement sections 23 are formed on each one end of the torque bar sections 17 in a manner that they are bent backward, and are engaged on the front bracket for supporting fittings. The arm sections 19 are integrally provided on the other sides of the respective torque bar 17. The arm sections 19 are formed in a manner that they are bent from the torque bar section 17 to upper side. The respective tip portions 25 of the arm sections 19 are formed in a manner that they are bent inside in the seat width direction.

An arm supporting bracket 27 is provided on a front lower surface of the support panel 3 on a left side thereof in the seat width direction. The arm supporting bracket 27 has a substantially cylindrical shape. Specifically, the arm supporting bracket 27 includes a flat plate portion 29 and front and rear side round portions 31. The flat plate portion 29 is supported on the lower surface of the support panel 3 through a movement absorbing mechanism A. That is, in this first example, the movement absorbing mechanism A is formed of a rectangular parallelopiped-shaped mount rubber 32. The mount rubber 32 is sealed to the flat pate portion 29 of the arm supporting bracket 27 and also adhered to the lower surface of the support panel 3. A collar 33 is fitted to the arm supporting bracket 27. The collar 33 is of a cylindrical shape with a bottom and has a peripheral flange 37 on an opening 35 side thereof. The peripheral flange 37 faces to the end surface 39 of the arm supporting bracket 27. The tip portion 25 of the arm section 19 is fittedly supported in the opening 35 of the collar 33. Thus, the left front portion of the support panel 3 is elastically supported through the left front torsion bar 7.

Then, the rear section of the seat device will be described. The right rear torsion bar 9 and the left rear torsion bar 11 have substantially symmetrical shapes. In this first example, both torsion bars 9 and 11 are disposed in offset in the seat longitudinal direction, which ensure sufficiently long torsion bar in the limited width of the cushion frame, and durability of the torsion bar can be increased. That is, both torsion bars 9 and 11 include a torque bar sections 41 and arm sections 43. The torque bar sections are formed in a sufficient length and disposed in offset such that they are disposed in parallel on the front and rear sides above the rear bracket 15 for supporting rear fittings. The torque bar 41 of the right rear torsion bar 9 is rotatably supported by fittings 45 for supporting the right rear torsion bar, and on the other hand, the torque bar 41 of the left rear torsion bar is rotatably supported by fittings 47 for supporting the right torsion bar.

One end of the torque bar 41 of the right rear torsion bar 9 is bent toward the back side of the seat, so that it is supported with an engagement holder 49 of the fittings 47 for supporting the left rear torsion bar. One end of the torque bar 41 of the left rear torsion bar 11 is bent toward the front side of the seat, so that it is also supported with an engagement holder 51 of the fittings 45 for supporting the right rear torsion bar. The arm section 43 of the left rear torsion bar 11 is raised forward and upward, having a bent portion 53 in a mid portion therein. The tip portion 55 of the arm section 43 is bent inside in the seat width direction, and rotatably supported by an arm supporting bracket 59 through a collar 57. The arm supporting bracket 59 is fixed to the lower surface of the support bracket 59 by welding or the like. Thus, the left rear portion of the support panel 3 is elastically supported by the left rear torsion bar 11 with respect to the cushion frame 1.

Although not shown, the arm section 43 of the right rear torsion bar 9 has the same supporting structure as that of the arm section 43 of the left rear torsion bar 11, so that the support panel 3 is elastically supported by the 35 right rear torsion bar 9 with respect to the cushion frame 1. Further, although not shown, the arm section 43 of the right rear torsion bar 9 has the same supporting structure, and the arm section 43 is elastically supported by the left rear torsion bar 9 with respect to the cushion frame 1. In this way, the panel 3 has such structure that front left and right corners and rear left and right corners or four corners of the support frame 3 are elastically supported through torsion bars with respect to the cushion frame 1.

Details of portions around the arm 19 of the left front torsion bar 7 are shown in FIG. 4 in enlargement seen from the front thereof. As shown in FIG. 4, the tip portion 25 of the arm section 19 is fittedly supported by the collar 33 and comes into contact with the bottom of the collar 33, so that the arm section 19 is positioned. The collar 33 is fitted to the arm supporting bracket 27. The circumferential flange 37 of the collar 33 faces to the end surface 39 of the arm supporting bracket 27. The arm supporting bracket 27 is attached to the lower surface of the support panel 3 through the mount rubber 32. That is, a surface 61 for attachment is formed on the support panel 3 by embossing and the upper surface of the mount rubber 32 is fixed to the surface 61 for attachment by bonding or the like.

Operations of the seat device of the first example will be then described. First, an outline of the entire operations of the seat will be described in FIG. 3. When the occupant is seated on a seat, the supporting panel 3 is lowered together with a seat pad (not shown), and a load is effected on the collars 33 and 57 through the arm supporting brackets 27 and 59. Then, the arm sections 19 and 43 of torsion bars 5, 7, 9 and 11 are moved downward, and the respective torque bar sections 17 and 41 have torsional deformation, thereby generating a reaction force. When the reaction force and the downward load are balanced, the support panel 3 and the cushion pad come to a standstill. When vibration is given, the respective torsion bars 5, 7, 9 and 11 absorb it. Therefore, a comfortable ride for the occupant is remarkably improved. The support panel 3 is slightly moved to the front side of the seat. At this time, the collars 33 of the front torsion bars 5 and 7 are relatively moved backward with respect to the arm supporting brackets 27, whereby movement of the arm sections 19 and 43 of the respective torsion bars 5, 7, 9 and 11 can be executed smoothly. Thus, the comfortable ride and vibration breaking properties on the seat can be improved.

Operations of the movement absorbing mechanism A will now be described. In this case, the operations are described in comparison with the structure shown in FIG. 5, in which a movement absorbing mechanism is not provided. The same reference numerals as in the first example are used for convenience. First, in FIG. 5A, when the occupant is seated on a seat, the support panel 3 is lowered, and a load is acted on the collar 33 through the arm supporting bracket 27. Accordingly, the collar 33 and the tip portion of the arm section 19 are moved so as to bend the axis downward, as shown by an arrow B, whereby a relative angle θ is formed between the arm supporting bracket 27 and the collar 33. At this time, the arm supporting bracket 27 strongly abuts against the outer upper portion 63 of the collar 33 in the seat width direction. Therefore, a load concentrates at the upper portions of the collar 33, thereby generating a high surface pressure. That is, in the difference between the surface pressures of the inside and outside of the collar 33, the surface pressure is not increased at all inside the collar 33, and a remarkably high pressure is generated outside the collar 33, as shown in FIG. 5B. Accordingly, the high surface pressure causes a structure deformation, wear, surface roughening or the like on the surface of the collar 33, which leads to a cause of vibration with dull thud due to a relative movement of the collar 33 and the arm supporting bracket 27, derived from a change of deflection of the seat. Further, as an inclination of the collar 33 is increased, the upper portion side of the circumferential flange 37 is protruded on the end surface 39 side of the arm supporting bracket 27. Accordingly, a contact pressure between the circumferential flange 37 and the end surface 39 of the arm supporting bracket 27 is increased, and the structure deformation, wear, surface roughning or the like is progressed, which is also likely to cause vibration with dull thud.

On the other hand, in the first example of the present invention, the mount rubber 32 is deformed by movement of the collar 33 whose axis is inclined as shown by an arrow A in FIG. 8A, and the arm supporting bracket 27 follows the deformation. Accordingly, a relative angle formed by the collar 33 and the arm supporting bracket 27 reaches substantially zero or an extremely small value. Thus, a contact length between the collar 33 and the arm supporting bracket 27 is not changed at all, and a contact surface pressure of the collar 33 against the arm supporting bracket 27 is dispersed in the axial direction thereof, as shown in FIG. 8B. In this way, the structure deformation, wear, surface roughning or the like is prevented. Consequently, the vibration with thud due to the relative movement between the collar 33 and the arm supporting bracket 27 is not generated or it is prevented. By projection of the circumferential flange 37 due to the increase of inclination of the collar, the circumferential flange 37 is brought into contact with the end surface 39 of the arm supporting bracket 27. However, in this case shown in FIG. 4, the contact surface pressure between the end surface 39 of the arm supporting bracket 27 and the circumferential flange 37 is held to a low level, and the structure deformation, wear, surface roughning or the like of the end surface 39 and the arm supporting bracket 27 is prevented. Consequently, vibration with thud is not generated or it is prevented. Therefore, when the mount rubber 32 is provided as a displacement absorbing mechanism A, as in this example, the ride and vibration prevention properties are remarkably improved. Additionally, the mount rubber 32 has the vibration absorption properties, and thus, a comfortable ride and vibration breaking properties are improved.

Another example will now be described. In this case, the same reference numerals are represented to the same elements as in the above-mentioned first example, and the same explanations are omitted.

SECOND EXAMPLE

Figure 7A:
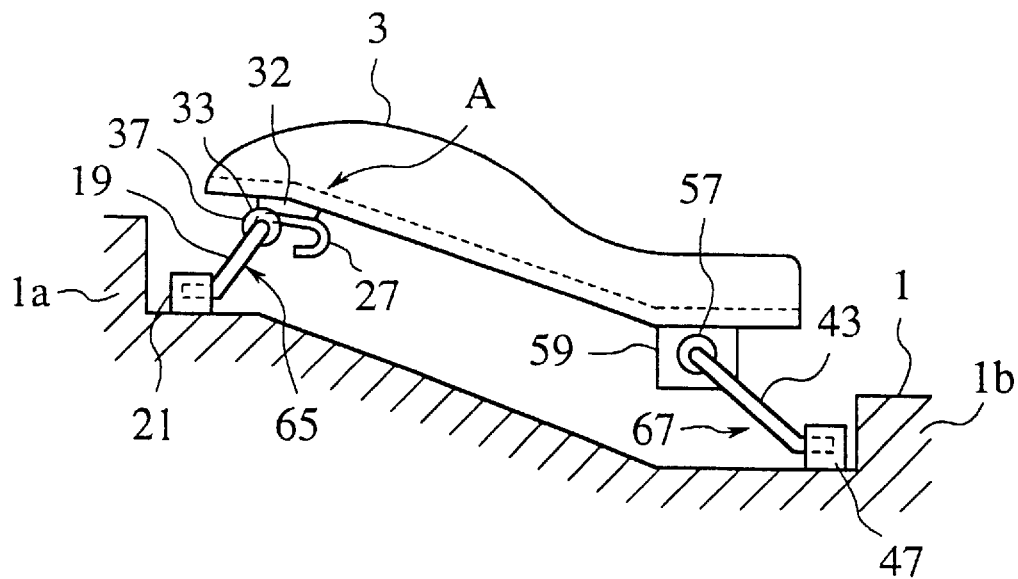
FIGS. 7A–7B are view of a seat device according to a second example of the present invention, particularly 9A is a side view thereof and 9B is a bottom view thereof.
Figure 7B:
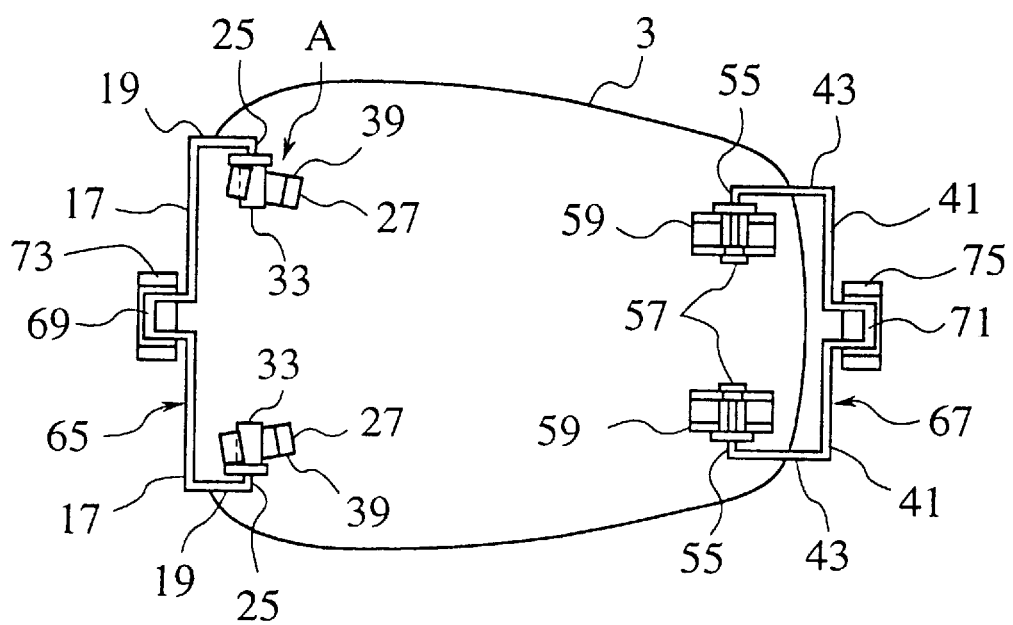
Figure 8:
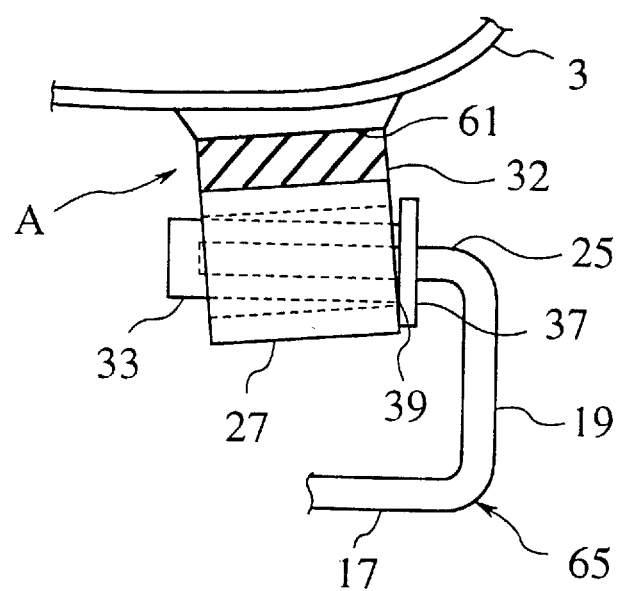
FIG. 8 is a front view of a main portion of a seat device according to a second example of the present invention.

FIGS. 7 to 11 show a second example of the present invention. FIG. 7 shows a whole view of a seat device according to this example, particularly FIG. 7A is a side view, and FIG. 7B is a bottom view. This example has the following features, that is, an arm supporting bracket 27 is provided in a V-shape, when seen from the bottom, as shown in FIG. 7A, and the arm supporting bracket 27 is provided in such a manner that it has a relative angle to a collar 33, as shown in FIG. 8.

Now, whole portions different from those in the first example will be schematically described by using FIGS. 7A and 7B. First, a torsion bar is constructed by a front torsion bar 65 and a rear torsion bar 67. To the torsion bars 65 and 67 are provided projection portions 69 and 71 respectively, in the central portion of the seat in the width direction. The projection portions 69 and 71 are respectively supported by brackets 73 and 75 provided on the cushion frame 1 side, whereby movement of the respective one ends of the torque bar sections 17 and 41 in a torsional direction and an axial direction thereof is suppressed. Other whole construction is substantially the same as in the example 1.

In this second example, the arm supporting brackets 27 are provided in such a manner that they are inclined previously in a V shape, as shown in FIG. 7B. This inclination of the arm supporting bracket is set so that the end surface 39 of thereof follows a seat movement in the longitudinal direction and in the width direction. The arm supporting brackets 27 are attached to the tip portion 25 of the arm section 19 and the collar 33 in a manner that the former have a relative angle with respect to the latter previously. When the occupant is statically seated on a seat, a load is acted on the collar from the arm supporting bracket 27. Consequently, when the arm supporting brackets 27 are displaced so that they incline the axis thereof 25 of the arm portion 19 and the collar 33, and then stand still, the above-mentioned relative angle corresponds to the inclination angle in the seat vertical direction.

Figure 10A:
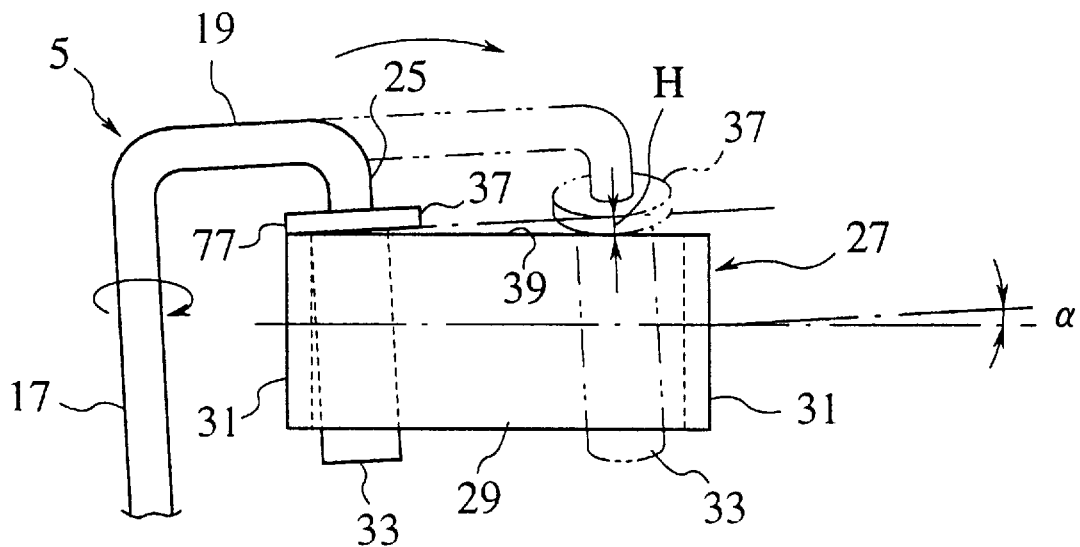
FIG. 10A–10B are enlarged view of a main portion of a seat device according to a second example of the present invention, particularly 12A is a front view thereof and 12B is a side view thereof.
Figure 10B:
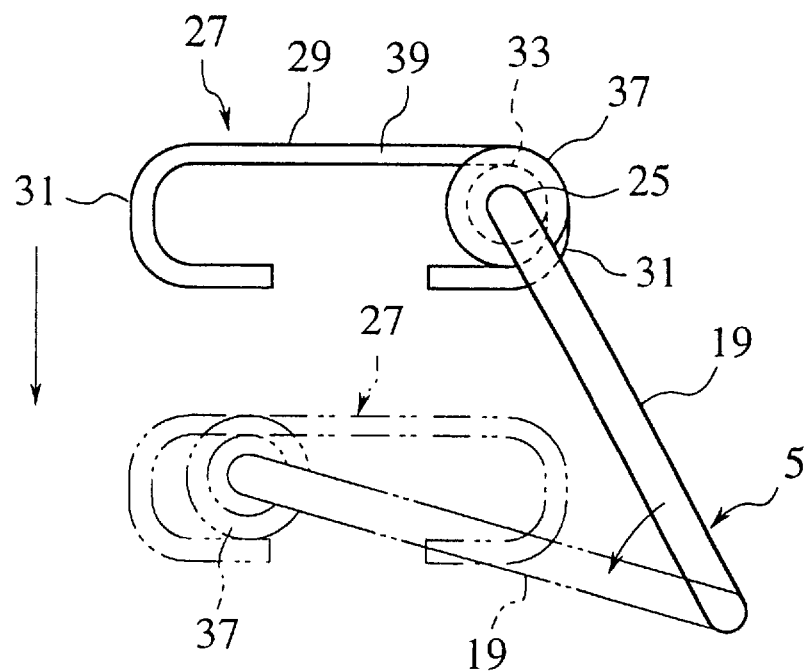

Therefore, in a state where the occupant is seated (the seat pad stands still), the inclination of the axis of the arm supporting bracket 27 coincides with the inclination of the tip portion 25 of the arm section 19 and the collar 33, as shown in FIG. 9A. Accordingly, a surface pressure generated between the arm supporting brackets 27 and the collar 33 is substantially constant in their axial direction, as shown in FIG. 9B. When vibration or the like is conducted from the floor side of the vehicle by moving, the support panel 3 is moved vertically with a position for static deflection centered. Accordingly, Both the arm supporting bracket 27 and collar 33 are rotated (neck vibration) with the axis centered, the axis being shown in FIG. 9A. For example, when the support panel 3 is moved downward, the axis is also moved, as shown in FIG. 9C. At this time, a surface pressure in the axial direction, between the arm supporting bracket 27 and the collar 33 is shown in FIG. 9D. In this surface pressure, the pressure of the outside is a little higher than that of the inside, which is different from the case shown in FIG. 9B. However, since,in this case shown in FIG. 9D, stress concentration does not exist, the surface pressure is not so increased even on the outside. On the other hand, when the support panel 3 is moved upward, the axis is moved, as shown in FIG. 9E. At this time, the surface pressure in the axial direction is shown in FIG. 9F. Thus, the outside surface pressure in the axial direction is fairly reduced in comparison with the case of FIG. 9B, and the inside surface pressure in the axial direction is slightly reduced in comparison with the case of FIG. 9B. Thus, load distribution of the mount rubber 32, the collar 33, and the arm supporting bracket 27 becomes further even than in the case of the first example. Therefore, the maximum stress generated in these members is reduced, thereby further enhancing the durability Effects of the above-mentioned inclined arm support bracket 27 are shown in FIG. 10. Namely, the arm supporting bracket 27 is attached to the collar 33 at a relative angle of α, as shown in FIG. 10A. Thus, a front end 77 of the circumferential 37 abuts against the end surface 39 of the arm supporting bracket 27, before seating. When the occupant is seated on a seat, the arm section 19 is moved by an effect of load on the collar 33, and the collar 33 is moved backward in the seat longitudinal direction as shown in FIGS. 10A and 10B, and at the same time, the circumferential flange 37 is finally protruded by H inside in the seat width direction. The end surface 39 of the arm supporting bracket 27 has an angle, which accords with the movement for the projection. Accordingly, even on the way where the flange 37 is moving, and further even in the final position shown by chain lines in FIGS. 12A and 12B, a contact pressure between the circumferential flange 37 and the arm supporting bracket 27 is not increased or it is prevented. Thus, vibration with thud can be prevented, and durability can be enhanced.

As explained above, in addition to the fact that substantially the same effects as in the above-mentioned example 1 can be made even in the second example, vibration with thud can be prevented, and the comfortable ride and vibration breaking properties can be enhanced, and at the same time, durability can be remarkably enhanced.

This second example describes a case where the collar 33 faces inside in the seat width direction. However, the same effects as in the case can be obtained even in a case where it faces outside by setting the arm supporting brackets 27 which are positioned on both sides in the seat width direction, in a 180°-rotated V shape not V shape.

Further, the above-mentioned left and right torsion bars 5 and 7, and their mounting structure can be applied to front and rear seat positions, and setting of the arm supporting bracket 27 in a 180°-rotated V shape or V shape can be made in the seat width direction.

THIRD EXAMPLE

FIG. 11 shows a third example. The third example uses a hinge mechanism 79 as a movement absorbing mechanism A. An upper hinge bracket 81 is fixed to the lower surface of the support panel 3, and a lower hinge bracket 83 is fixed to the arm supporting bracket 27 side. Both hinge brackets 81 and 83 are connected to each other by using a hinge pin 85. Therefore, the arm supporting bracket 27 can be rotated as shown by an arrow C with the hinge pin 85 centered, and the movement can be absorbed.

Substantially the same effects as in the above-mentioned example 1 can be made even in the third example, Further, by a basically rigid support in this example, the support of the support panel 3 can be stabilized.

FOURTH EXAMPLE

Figure 12A:
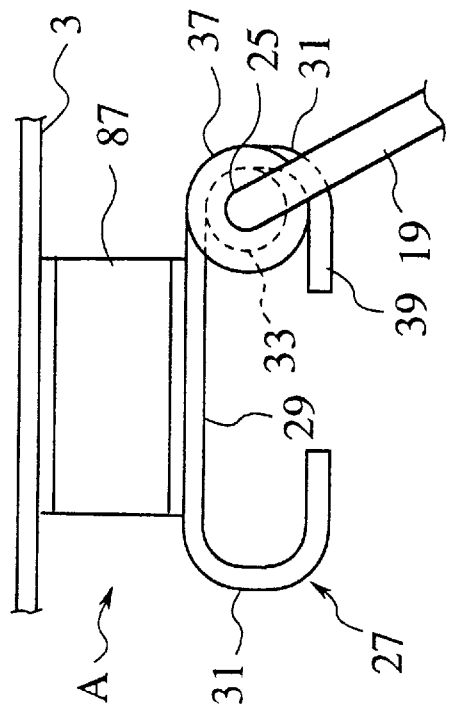
FIG. 12A–12B are enlarged view of a main portion of a seat; device according to a fourth example of the present invention, particularly 14A is a front view thereof and 14B
Figure 12B:
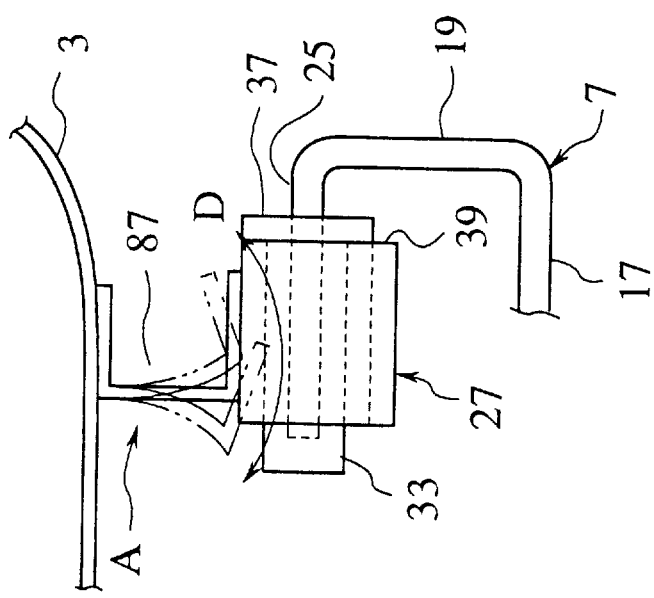

FIG. 12 shows a fourth example. The third example uses an elastic plate 87 as a movement absorbing mechanism A. The elastic plate 87 is formed in such a manner that it has a C-shaped cross section, and the plate 87 is fixed to both the lower surface of the support panel 3 and a flat portion 29 of the arm supporting bracket 27. The mounting direction of the elastic plate 87 can be made contrary to that of the case shown in FIG. 12A, that is, inside direction. In this fourth example, the arm supporting bracket 27 can be moved as shown by an arrow D, by deformation of the elastic plate 87. Therefore, substantially the same effects as in the above-mentioned example 1 can be made even in the fourth example. Further, since the elastic plate is used as the movement absorbing mechanism A, the structure of the seat device is simple, and can be produced at a low cost.

Although not shown, a spherical surface Joint can be used as the movement absorbing mechanism A. In turn, torsion bars 5 and 7, and the mounting structure can be provided for the front and rear portions of the seat.

As described above, according to the invention of claim 1, movement of the arm supporting bracket can be accepted by a movement absorbing mechanism, and increase of a relative angle formed by the arm supporting bracket and the collar can be suppressed. Therefore, vibrations with thud between the arm supporting bracket and the collar, and the circumferential flange and the arm supporting bracket can be suppressed. Accordingly, a comfortable ride and vibration breaking properties can be further improved.

According to the invention of claim 2, in addition to effects of the invention of claim 1, movement of the arm supporting bracket can be absorbed by an elastic body.

Accordingly, the surface pressure between the arm supporting bracket and the collar can be also absorbed by the elastic body, whereby a comfortable ride and vibration breaking properties can be further improved.

According to the invention of claim 3, in addition to effects of the invention of claim 1 or 2, a relative angle formed by the collar and the arm supporting bracket due to a static seating can be made zero or a little. Accordingly, a surface pressure between the arm supporting bracket can be further made uniform, and increase of the contact pressure between the circumferential flange and the arm supporting bracket can be also suppressed. Thus, the vibration with thud can be further suppressed, and a comfortable ride and vibration properties can be further improved.

According to the invention, in addition to effects of the invention of claim 1, movement of the arm supporting bracket can be hinged by a hinge mechanism.

Therefore, supporting of the support member can be stabilized by the basically rigid supporting.

According to the invention of claim 5, even if the circumferential flange moves in the seat longitudinal direction and the width direction, and is projected to the end surface of the arm supporting bracket, increase of the contact pressure between the circumferential flange and the end surface of the arm supporting bracket can be suppressed, whereby vibration with thud can be also suppressed. Accordingly, a comfortable ride and vibration breaking properties can be further improved.

According to the invention of claim 4, in addition to effects of the invention of claim 2, movement of the arm supporting bracket can be absorbed by a mount rubber.

Thus, vibration absorbing properties and surface pressure absorbing properties can be further improved by the mount rubber.

According to the invention, in addition to effects of the invention of claim 2, movement of the arm supporting bracket can be absorbed by an elastic plate. Therefore, the structure of the seat device is extremely simple, and can be produced at a low cost.

According to the invention, in addition to effects of the invention of claim 2, movement of the arm supporting bracket can be absorbed by a spherical surface joint. Thus, not only movement of rotation of the arm supporting bracket in a plan in the vertical direction, but also movement of rotation of the arm supporting bracket in a plan in the horizontal direction,can be rigidly absorbed, whereby vibration with thud can be suppressed.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A seat device comprising:

a cushion frame mounted on a floor;

a support member for supporting a seat pad; and a torsion bar including a torque bar section and an arm section, for elastically supporting said support member on said cushion frame;

an arm supporting bracket in a substantially cylindrical shape being provided on said support member;

a collar being provided, which is rotatably fitted to at least said arm supporting bracket and has a circumferential flange in a cylindrical shape with a bottom, facing to an end surface of said arm supporting bracket on the opening side thereof;

a tip portion of said arm section being fittedly supported in the opening of said collar; and said arm supporting bracket being attached to said support member through a movement absorbing mechanism which allows relative movement with respect to said support member.

2. The seat device according to claim 1, wherein said movement absorbing mechanism is an elastic body.

3. The seat device according to claim 1, wherein said arm supporting bracket is attached to the tip portion of the arm section and the collar with a relative angle previously so that said arm supporting bracket corresponds to an inclination position in a seat vertical direction, after movement of the tip portion of said arm section and collar by static seating.

4. The seat device according to claim 2, wherein said elastic body is a mount rubber.

5. A seat device comprising:

a cushion frame mounted on a floor;

a support member for supporting a seat pad; and a torsion bar including a torque bar section and an arm section, for elastically supporting said support member on said cushion frame;

an arm supporting bracket in a substantially cylindrical shape being provided on said support member;

a collar being provided, which is fitted to at least said arm supporting bracket relatively movably in a seat longitudinal direction or a seat width direction and rotatably, and has a circumferential flange in a cylindrical shape with a bottom, facing to an end surface of said arm supporting bracket on the opening side thereof;

a tip portion of said arm section being fittedly supported in the opening of said collar, and said arm supporting bracket being previously inclinedly attached to the circumferential flange at a position where the collar is attached to, so that the end surface of the arm supporting bracket corresponds to movement of the circumferential flange in the collar in seat longitudinal and width directions.

6. A seat device comprising:

a seat member for receiving a seating load;

a bracket member responsible for a total load of the seat member including the seating load;

a cushion frame member mounted on a floor;

a torsion bar member secured at a base end thereof to the cushion frame member, the torsion bar member having a spring portion twistable about a plurality of mutually non-parallel axes;

an integral member comprising a collar fitted on a free end of said torsion bar member and a flange extending in a radial direction of the collar, the integral member having said bracket member loosely fitted on the collar wherein:

the flange prevents the bracket member from hitting against the spring portion of the torsion bar member; and the bracket member being in a varied position relative to the integral member as the seating load varies within a range including a minimum load predetermined for a non-seated condition of the seat member, and an average load predetermined for probable seated conditions of the seat member; and a variation absorbing means for absorbing a variation of a relative position between the minimum load and the average load so as to have the bracket member brought into a surfacial contact with the collar and the flange, as the seating load is varied to the average load.

* * * * *